United States Patent
Suzuki et al.

(10) Patent No.: US 11,012,010 B2
(45) Date of Patent: May 18, 2021

(54) AUXILIARY POWER SUPPLY DEVICE AND ELECTRIC POWER STEERING SYSTEM

(71) Applicant: JTEKT CORPORATION, Osaka (JP)

(72) Inventors: Shingo Suzuki, Nagoya (JP); Fumihiko Sato, Kashiwara (JP)

(73) Assignee: JTEKT CORPORATION, Osaka (JP)

(*) Notice: Subject to any disclaimer, the term of this patent is extended or adjusted under 35 U.S.C. 154(b) by 29 days.

(21) Appl. No.: 16/550,441

(22) Filed: Aug. 26, 2019

(65) Prior Publication Data
US 2020/0076335 A1 Mar. 5, 2020

(30) Foreign Application Priority Data

Aug. 31, 2018 (JP) .............................. JP2018-163091

(51) Int. Cl.
| | |
|---|---|
| *H02P 21/00* | (2016.01) |
| *H02P 4/00* | (2006.01) |
| *H02P 27/06* | (2006.01) |
| *H02P 21/22* | (2016.01) |
| *B62D 6/08* | (2006.01) |
| *B62D 6/00* | (2006.01) |
| *B62D 5/04* | (2006.01) |

(52) U.S. Cl.
CPC .............. *H02P 4/00* (2013.01); *B62D 5/0463* (2013.01); *B62D 6/00* (2013.01); *B62D 6/08* (2013.01); *H02P 21/22* (2016.02); *H02P 27/06* (2013.01); *B62D 5/0409* (2013.01)

(58) Field of Classification Search
CPC .... B62D 5/0409; B62D 5/046; B62D 5/0463; B62D 5/0469; B62D 6/00; B62D 6/08; H02P 21/22; H02P 27/06; H02P 4/00
USPC ...................................................... 318/400.02
See application file for complete search history.

(56) References Cited

U.S. PATENT DOCUMENTS

| | | | |
|---|---|---|---|
| 6,178,076 B1* | 1/2001 | Dahler ................. | H02J 3/1814 307/102 |
| 2009/0140673 A1* | 6/2009 | Kasai ....................... | H02J 1/08 318/139 |
| 2015/0035464 A1* | 2/2015 | Maekawa ................ | H02P 6/24 318/400.21 |
| 2015/0251690 A1* | 9/2015 | Yamamoto .......... | H02P 29/0241 318/400.21 |

(Continued)

FOREIGN PATENT DOCUMENTS

WO 2016/051884 A1 4/2016

*Primary Examiner* — Eduardo Colon Santana
*Assistant Examiner* — Gabriel Agared
(74) *Attorney, Agent, or Firm* — Oliff PLC

(57) ABSTRACT

An auxiliary power supply device includes a parasitic diode forming a parallel circuit together with a second switching element and connected in a forward direction to a main power supply, and a parasitic diode forming a parallel circuit together with a fourth switching element and connected in a reverse direction to an auxiliary power supply. When a state parameter indicates that a reaction force that interferes with operation of an assist motor is applied, an electronic control unit turns ON a first switching element, turns OFF the second switching element, turns ON a third switching element, and turns OFF the fourth switching element. A regenerative current from the assist motor flows to the auxiliary power supply via an inverter, the third switching element, and the parasitic diode.

7 Claims, 5 Drawing Sheets

(56) References Cited

U.S. PATENT DOCUMENTS

2016/0297471 A1* 10/2016 Yamanaka .............. H02P 6/085
2018/0194389 A1    7/2018 Imamura

* cited by examiner

AUXILIARY POWER SUPPLY DEVICE AND ELECTRIC POWER STEERING SYSTEM

INCORPORATION BY REFERENCE

The disclosure of Japanese Patent Application No. 2018-163091 filed on Aug. 31, 2018 including the specification, drawings and abstract, is incorporated herein by reference in its entirety.

BACKGROUND OF THE INVENTION

1. Field of the Invention

The present invention relates to an auxiliary power supply device and an electric power steering system.

2. Description of the Related Art

Electric systems installed in a vehicle include an electric power steering system (hereinafter referred to as an "EPS") that assists the driver in steering. The EPS includes a motor for assisting in steering. The EPS drives the motor for assisting in steering, in response to a rotation operation of a steering member such as a steering wheel, and applies power generated by the motor to a steering mechanism, thereby assisting in steering (see WO2016/051884 Pamphlet).

In the EPS, if a large assist torque is applied by the motor when a steering system is close to the maximum steering angle (rack end), a large impact is applied at the time when the steering system reaches the maximum steering angle (hereinafter referred to as "end abutment"), so that hitting noise is generated. Thus, the driver may feel uncomfortable.

According to WO2016/051884, to prevent a large impact at the time of end abutment, the force of end abutment is reduced by limiting a current command value for the motor when close to the rack end.

In the case of heavy vehicles, since the vehicle weight is large, the steering axial force during steering is large when the vehicle is stationary. Therefore, an EPS system that includes an auxiliary power supply system having an auxiliary power supply in addition to a main power supply for EPS, and an EPS system that includes an auxiliary power supply system having a backup function in addition to an auxiliary battery for EPS are provided (see FIGS. 5A and 5B).

In the EPS system that includes an auxiliary power supply system having a backup function, when a reaction force due to end abutment, etc. is not applied to an EPS motor 400, a current is supplied from a main power supply 100 to the EPS motor 400 via an auxiliary power supply system 200 and an EPS inverter 300 as illustrated in FIG. 5A.

Meanwhile, when a reaction force due to end abutment, etc. is applied to the EPS motor 400, a regenerative current as regenerative energy is generated. The regenerative current flows from the EPS motor 400 to the main power supply 100 via the EPS inverter 300 and the auxiliary power supply system 200 as illustrated in FIG. 5B.

The main power supply 100 is usually formed of, for example, a lead battery. That is, if the regenerative current flows to the main power supply 100, a phenomenon may occur in which deterioration of the lead battery is accelerated. In particular, if the driver operates the steering member until end abutment occurs, a large regenerative energy, that is, a large regenerative current is generated. Therefore, in order to increase the merchantability of the product, this phenomenon needs to be addressed.

SUMMARY OF THE INVENTION

An object of the present invention is to provide an auxiliary power supply device and an electric power steering system capable of preventing a regenerative current of a motor from flowing to a main power supply, and reducing deterioration of the main power supply.

According to an aspect of the present invention, there is provided an auxiliary power supply device including an auxiliary power supply that is connected in parallel to a main power supply and supplies a direct current to an inverter connected to a rotary electric machine in place of the main power supply; a switching unit including a first switching circuit disposed between the main power supply and the inverter, and a second switching circuit disposed between the auxiliary power supply and the inverter; and a control unit that switches between the main power supply and the auxiliary power supply to supply a direct current to the inverter by controlling the switching unit; wherein: the first switching circuit includes a first diode forming a parallel circuit together with a first changeover switching element and connected in a forward direction to the main power supply; the second switching circuit includes a second diode forming a parallel circuit together with a second changeover switching element and connected in a reverse direction to the auxiliary power supply; and the control unit is configured to, when a state parameter representing a state of an operation member operated by the rotary electric machine indicates that a reaction force that interferes with operation of the rotary electric machine is not applied, turn ON the first changeover switching element, and turn OFF the second changeover switching element, and when the state parameter indicates that a reaction force that interferes with operation of the rotary electric machine is applied, turn OFF the first changeover switching element and the second changeover switching element.

With the configuration described above, when a state parameter representing a state of an operation member operated by the rotary electric machine indicates that a reaction force that interferes with operation of the rotary electric machine is not applied, the control unit turns ON the first changeover switching element, and turns OFF the second changeover switching element. With this control operation, a direct current is supplied from the main power supply to the inverter via the first changeover switching element of the first switching circuit.

When the state parameter indicates that a reaction force that interferes with operation of the rotary electric machine is applied, the control unit turns OFF the first changeover switching element and the second changeover switching element. With this control operation, even when the state parameter indicates that a reaction force that interferes with operation of the rotary electric machine is applied, a direct current is supplied from the main power supply to the inverter via the first diode of the first switching circuit.

Thereafter, when a regenerative current is generated from the rotary electric machine, the regenerative current flows through the inverter to the auxiliary power supply via the second diode of the second switching circuit. Meanwhile, the regenerative current is blocked by the first changeover switching element in the OFF state and the first diode connected in the forward direction to the main power supply, and thus is prevented from flowing to the main power supply via the first switching circuit. Accordingly, the regenerative current of the rotary electric machine is prevented from flowing to the main power supply formed of a lead battery, so that deterioration of the lead battery serving as the main power supply is reduced.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
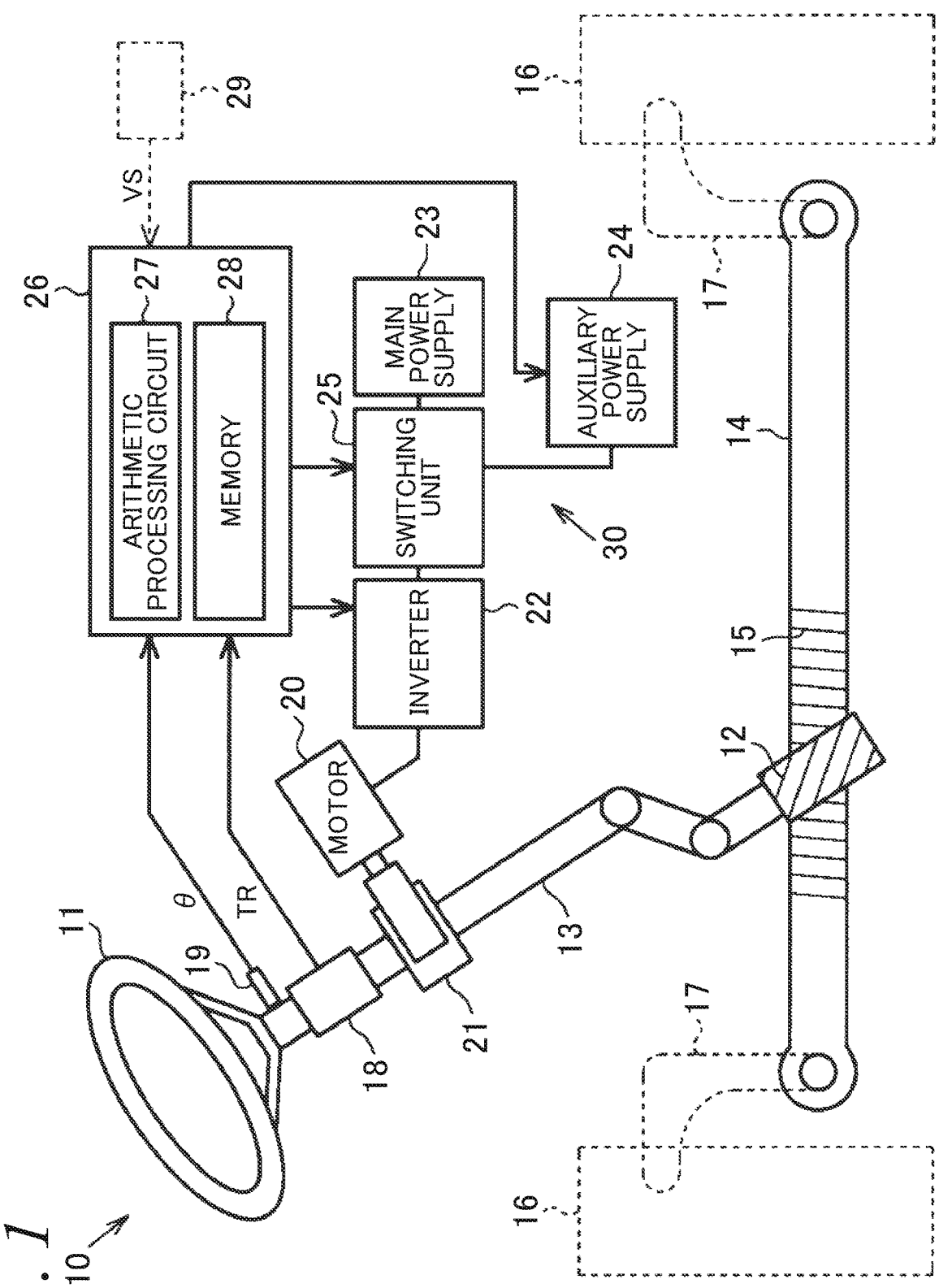
FIG. 1 is a schematic diagram illustrating the configuration of an electric power steering system according to an embodiment.

Hereinafter, an embodiment of the present invention will be described with reference to FIGS. 1 to 4. In the present embodiment, the present invention is embodied as an electric power steering system 10. As illustrated in FIG. 1, the electric power steering system (hereinafter referred to as the "EPS 10") includes a steering shaft 13 having one end to which a steering wheel 11 is fixed and another end to which a pinion gear 12 is fixed. The steering wheel 11 corresponds to a steering member. The pinion gear 12 meshes with a rack gear 15 formed in a rack shaft 14. The pinion gear 12 and the rack gear 15 form a rack-and-pinion mechanism that converts a rotational motion of the steering shaft 13 into a linear motion of the rack shaft 14 in the longitudinal direction. When the EPS 10 is mounted on the vehicle, the rack shaft 14 is attached to the vehicle body such that the longitudinal direction thereof coincides with the vehicle width direction. The opposite ends of the rack shaft 14 are respectively connected to right and left steered wheels 16 via tie rods 17. The rack shaft 14 corresponds to an operation member.

A torque sensor 18 for measuring a steering torque TR applied to the steering shaft 13 through the steering wheel 11 is attached to the steering shaft 13. In the present embodiment, the torque sensor 18 is a sensor configured to detect a torsion amount of a torsion bar forming a part of the steering shaft 13, and measure the steering torque TR based on the torsion amount.

A steering angle sensor 19 is provided in the vicinity of a steering-wheel-11-side portion of the steering shaft 13 coupled to the torsion bar. The steering angle sensor 19 detects a steering angle θ that is a rotation angle of the steering wheel 11 (rotation angle of the steering-wheel-11-side portion coupled to the torsion bar).

The steering angle sensor 19 detects the amount of rotation (rotation angle) of the steering wheel 11 from a neutral position (reference position) of the steering wheel 11 in each of the forward and reverse directions. The amount of rotation output from the steering angle sensor 19 has, for example, a positive value when the direction of rotation is to the right from the neutral position (steering angle θ=0), and has, for example, a negative value when the direction of rotation is to the left from the neutral position. The output amount of rotation may have a negative value when the direction of rotation is to the right, and have a positive value when the direction of rotation is to the left.

A motor for assisting in steering (hereinafter referred to as an assist motor 20) is connected to the steering shaft 13 via a reducer 21 that transmits the rotation of the assist motor 20 at a reduced speed to the steering shaft 13. In the present embodiment, the assist motor 20 is a three-phase brushless motor. Further, in the present invention, a worm gear mechanism is used as the reducer 21. The assist motor 20 corresponds to a rotary electric machine.

The EPS 10 includes an inverter 22, a main power supply 23, an auxiliary power supply 24 for backup, a switching unit 25, and an electronic control unit 26. The main power supply 23 is a lead battery. The auxiliary power supply 24 is a lithium ion capacitor. The inverter 22 converts a direct current output from the main power supply 23 or the auxiliary power supply 24 into a three-phase alternating current, and outputs the three-phase alternating current to the respective phases of the assist motor 20. In the case of using the auxiliary power supply 24 for backup in place of the main power supply 23, and in the case of causing a regenerative current to flow from the inverter 22 (described below) to the auxiliary power supply 24, the switching unit 25 switches between the main power supply 23 and the auxiliary power supply 24 to be connected to the inverter 22 in accordance with a switching command from the electronic control unit 26.

The electronic control unit 26 includes an arithmetic processing circuit 27 that performs arithmetic processing for control of the EPS 10, and a memory 28 storing programs and data for the control. The torque sensor 18 and a vehicle speed sensor 29 that detects a travel speed VS of the vehicle are connected to the electronic control unit 26.

The electronic control unit 26 performs assist control of the steering assist force applied by the assist motor 20 in the EPS 10. When performing assist control of the steering assist force, the electronic control unit 26 first determines a target assist force representing a target value of the steering assist force, based on the steering torque TR and the travel speed VS. Then, the electronic control unit 26 controls the inverter 22 so as to generate a steering assist force corresponding to the target assist force.

The auxiliary power supply 24, the switching unit 25, and the electronic control unit 26 form an auxiliary power supply device 30. The electronic control unit 26 corresponds to a control unit.

Figure 2:
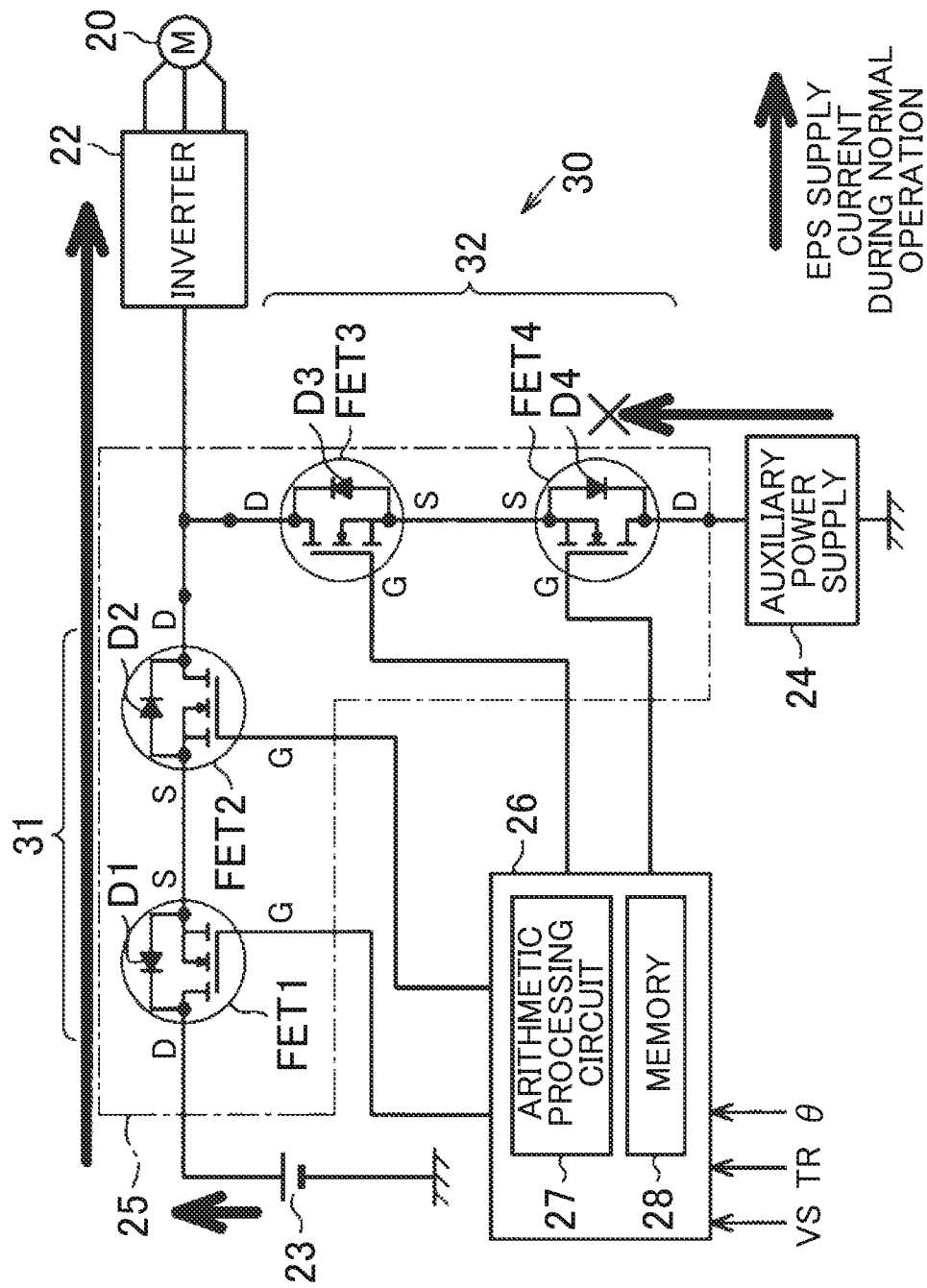
FIG. 2 is a circuit diagram illustrating the configuration of an electric circuit of the electric power steering system.

The switching unit 25 of the auxiliary power supply device 30 will be described. As illustrated in FIG. 2, the switching unit 25 includes a first switching circuit 31 connected between the main power supply 23 and an input terminal of the inverter 22, and a second switching circuit 32 connected between the auxiliary power supply 24 and the input terminal of the inverter 22. That is, the auxiliary power supply 24 is connected in parallel to the main power supply 23.

The first switching circuit 31 includes a first switching element FET1 and a second switching element FET2 that are reversely connected in series by connecting their source electrodes to each other. Specifically, the first switching element FET1 and the second switching element FET2 are enhancement (normally-off) n-channel metal-oxide semiconductor field-effect transistors (MOSFETs). In an alternative embodiment, drain electrodes of the switching elements FET1 and FET2 may be connected to each other. The second switching element FET2 corresponds to a first changeover switching element.

The first switching element FET1 and the second switching element FET2 respectively include parasitic diodes D1 and D2, each connected in parallel between a source and a drain. The parasitic diodes D1 and D2 are arranged so as to be connected in opposite directions. That is, the parasitic diode D2 is connected in the forward direction to the main power supply 23. The parasitic diode D2 corresponds to a first diode. The first switching element FET1 and the second switching element FET2 are controlled to be turned ON/OFF by the electronic control unit 26.

The second switching circuit 32 includes a third switching element FET3 and a fourth switching element FET4 that are reversely connected in series by connecting their source electrodes to each other. Specifically, the third switching element FET3 and the fourth switching element FET4 are enhancement (normally-off) n-channel MOSFETs. Note that drain electrodes of the switching elements FET3 and FET4 may be connected to each other. The fourth switching element FET4 corresponds to a second changeover switching element.

The third switching element FET3 and the fourth switching element FET4 respectively include parasitic diodes D3 and D4, each connected in parallel between a source and a drain. The parasitic diodes D3 and D4 are arranged so as to be connected in opposite directions. That is, the parasitic diode D4 is connected in the reverse direction to the auxiliary power supply 24. The parasitic diode D4 corresponds to a second diode. The third switching element FET3 and the fourth switching element FET4 are controlled to be turned ON/OFF by the electronic control unit 26.

When the main power supply 23 is usable, that is, in a normal state, the electronic control unit 26 turns ON the first switching element FET1 and the second switching element FET2, and turns OFF the third switching element FET3 and the fourth switching element FET4. Meanwhile, since the auxiliary power supply 24 is a backup power supply for the main power supply 23, when the main power supply 23 is not usable, the electronic control unit 26 turns OFF the first switching element FET1 and the second switching element FET2, and turns ON the third switching element FET3 and the fourth switching element FET4.

In the following, the operation of the EPS 10 including the auxiliary power supply device 30 will be described with reference to FIGS. 2 to 4.

The electronic control unit 26 always monitors the voltage of the main power supply 23 through a voltage sensor (not illustrated). When the voltage of the main power supply 23 has a voltage required by the inverter 22, the electronic control unit 26 determines that the main power supply 23 is in a normal state. The operation of the present embodiment is described assuming that the main power supply 23 is in a normal state.

When an ignition switch (not illustrated) is turned ON, the steering torque TR, the steering angle θ, and the travel speed VS are input to the electronic control unit 26 from the torque sensor 18, the steering angle sensor 19, and the vehicle speed sensor 29, respectively.

The electronic control unit 26 calculates a steering speed |dθ/dt|, based on the input steering angle θ. Then, the electronic control unit 26 refers to a state determination map (see FIG. 4) stored in advance in the memory 28, and determines in which of a normal operation range and a warning control range the steering angle θ and the steering speed |dθ/dt| are located. The steering angle θ and the steering speed |dθ/dt| correspond to a state parameter.

Figure 4:
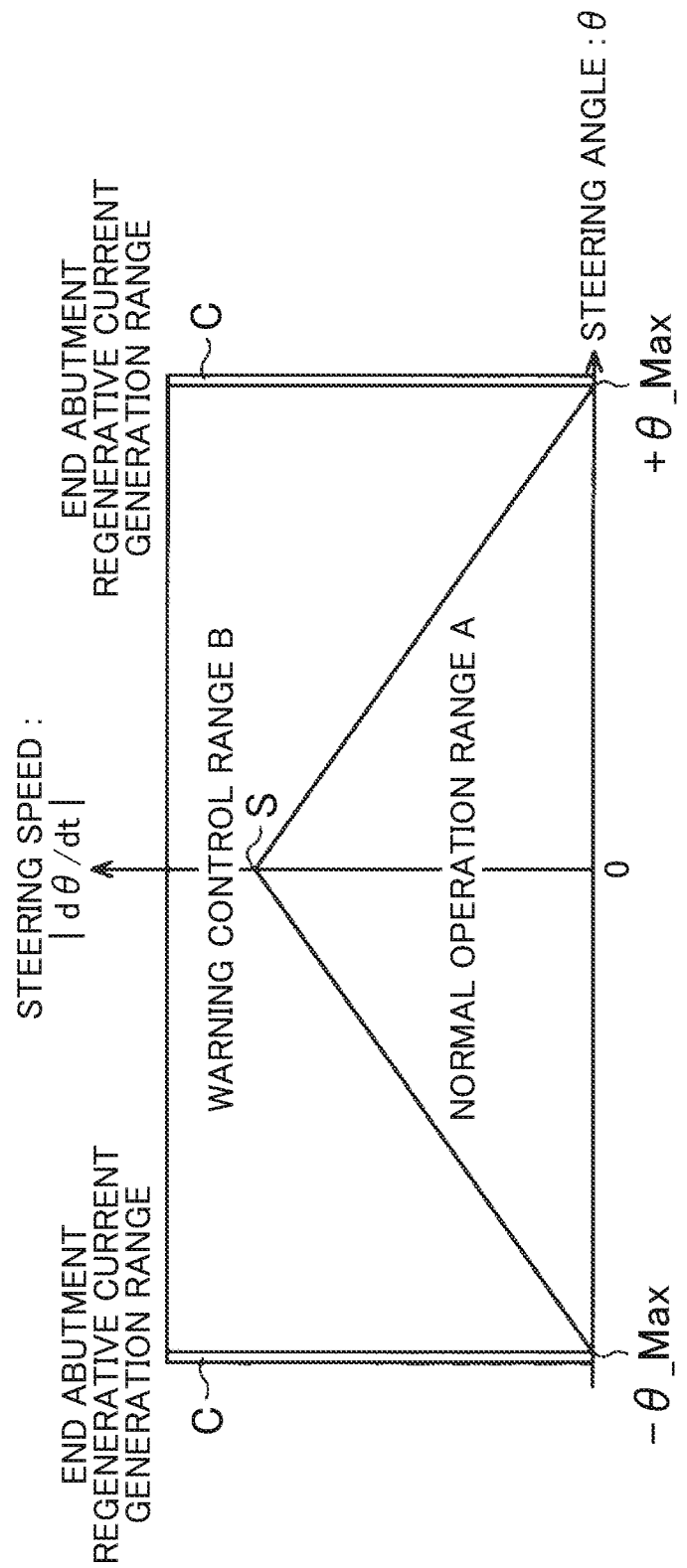
FIG. 4 is a state determination map for a steering angle and a steering speed.
Figure 5A:
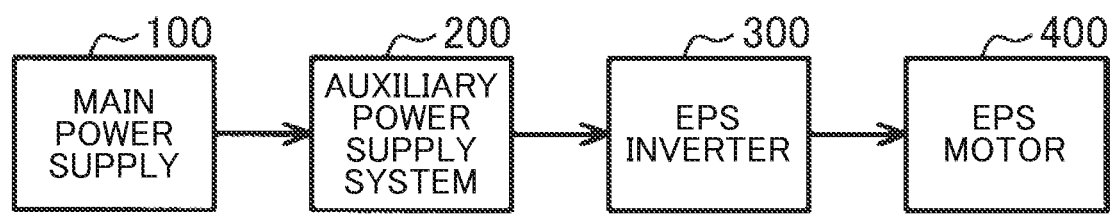
FIG. 5A illustrates a current path when an EPS system including an auxiliary power supply system is in a normal operation state.
Figure 5B:
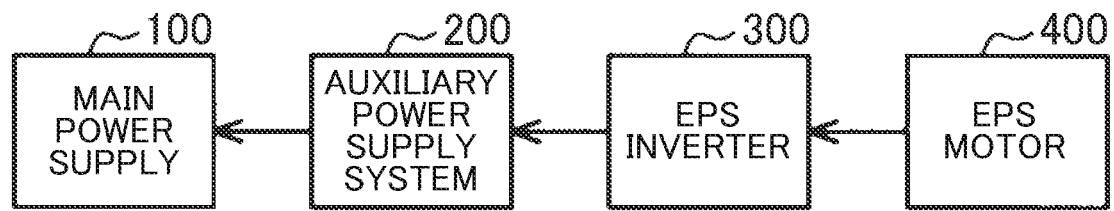
FIG. 5B illustrates a current path when regenerative energy is generated in the EPS system including the auxiliary power supply system.

The state determination map illustrated in FIG. 4 includes the normal operation range A, the warning control range B, and a regenerative current generation range C. The boundary conditions between the normal operation range A and the warning control range B are defined by a function |dθ/dt|=f (θ).

In the present embodiment, the boundary conditions are defined by a straight line connecting a point of (steering angle, steering speed)=(0, S) representing a vertex to a point of (steering angle, steering speed)=(left maximum steering angle +θ_Max, 0) and a straight line connecting the vertex to a point of (steering angle, steering speed)=(right maximum steering angle −θ_Max, 0). In the present embodiment, the boundary conditions are defined by straight lines. However, the boundary conditions are not limited to straight lines, and may be defined by an upward opening or downward opening quadratic curve extending from the vertex to ends (maximum steering angle, 0). The steering angle and the steering speed with which the function holds, and the steering angle and the steering speed in the warning control range B are the state parameters satisfying regenerative current generation sign conditions, and indicating that a reaction force that interferes with rotation of the assist motor 20 is applied. The steering angle and the steering speed in the normal operation range A are the state parameter not satisfying the regenerative current generation sign conditions, and indicating that a reaction force that interferes with rotation of the assist motor 20 is not applied.

The normal operation range A is a range containing combinations of a steering angle and a steering speed with which the steering system including the rack shaft 14, that is, the steering angle θ does not reach either of the right and left maximum steering angles (−θ_Max, +θ_Max), and there is completely no risk of end abutment.

The warning control range B is a range containing combinations of a steering angle and a steering speed with which there is no risk of end abutment by the steering system including the rack shaft 14. In this manner, the electronic control unit 26 determines whether the state of the rack shaft 14 is in the normal operation range A corresponding to the normal operation state, or in the warning control range B corresponding to a pre-end-abutment operation state that precedes output of a regenerative current by the assist motor 20 in response to a reaction force interfering with rotation of the assist motor 20.

The regenerative current generation range C is an area where the steering angle θ is greater than or equal to the right and left maximum steering angles (−θ_Max, +θ_Max), and is not relevant to the steering speed. In this area, end abutment occurs, and a regenerative current is generated from the assist motor 20.

When the electronic control unit 26 determines that the state parameter is in the normal operation range A, the electronic control unit 26 turns ON both the first switching element FET1 and the second switching element FET2 of the first switching circuit 31, and turns OFF both the third switching element FET3 and the fourth switching element FET4 of the second switching circuit 32.

As illustrated in FIG. 2, with this control operation, a direct current is supplied from the main power supply 23 to the inverter 22 via the first switching element FET1 and the second switching element FET2 of the first switching circuit 31.

When the electronic control unit 26 determines that the state parameter is in the warning control range B, the electronic control unit 26 turns ON the first switching element FET1, turns OFF the second switching element FET2, turns ON the third switching element FET3, and turns OFF the fourth switching element FET4.

Figure 3:
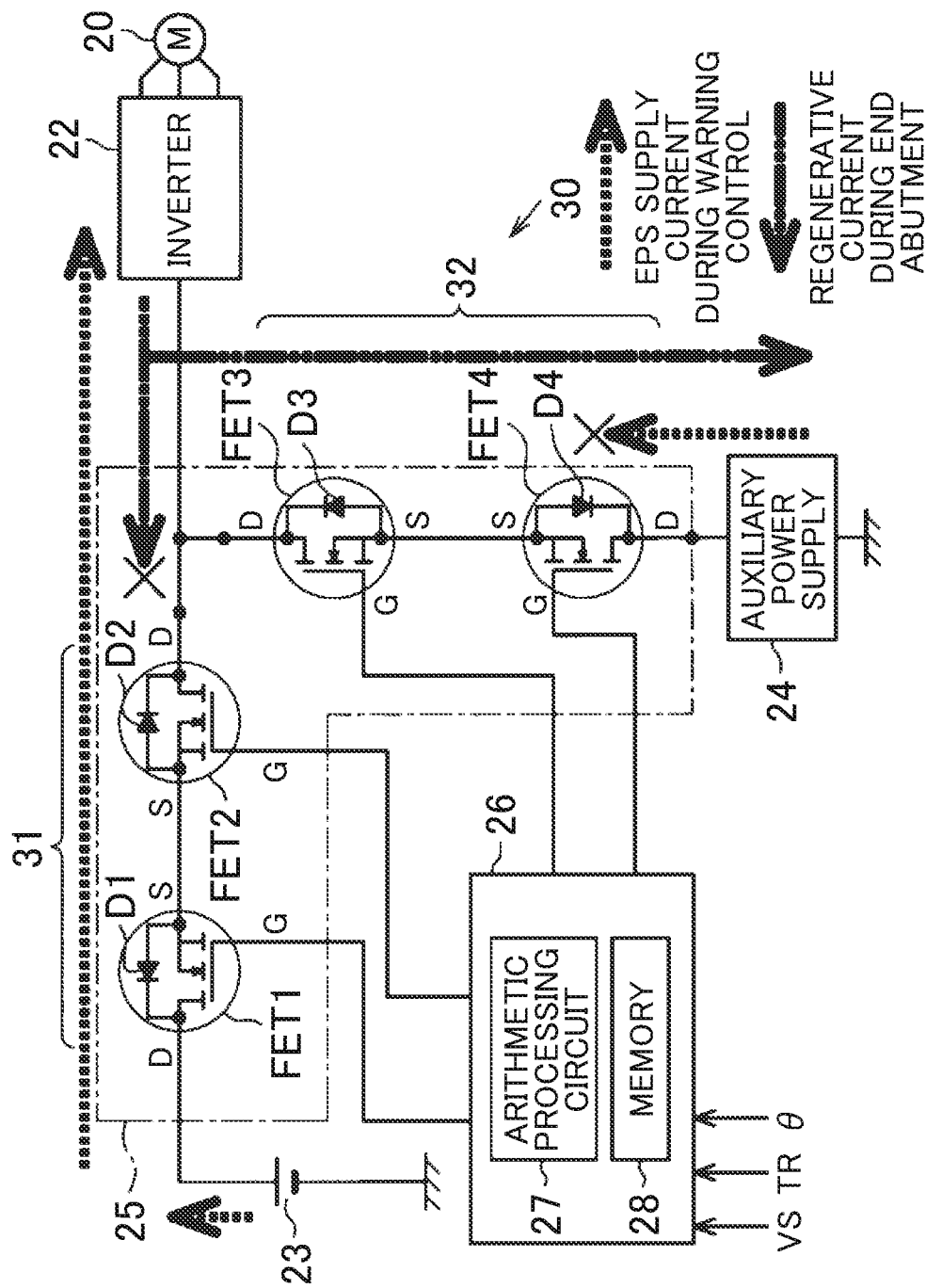
FIG. 3 is a circuit diagram illustrating the flow of a regenerative current from an inverter to an auxiliary power supply in a pre-end-abutment operation state in the electric circuit of the electric power steering system.

As illustrated in FIG. 3, with this control operation, even when the state parameter is in the warning control range B, a direct current is supplied from the main power supply 23 to the inverter 22 via the first switching element FET1 and the parasitic diode D2 of the first switching circuit 31.

Further, when the state parameter is in the warning control range B, the electronic control unit 26 turns ON the third switching element FET3, and turns OFF the fourth switching element FET4.

Thereafter, when a regenerative current is generated from the assist motor 20, the regenerative current flows through the inverter 22, and then flows to the auxiliary power supply 24 via the third switching element FET3 and the parasitic diode D4 of the second switching circuit 32. Meanwhile, the regenerative current is blocked by the second switching element FET2 in the OFF state and the parasitic diode D2 connected in the forward direction to the main power supply 23, and thus is prevented from flowing to the main power supply 23 via the first switching circuit 31.

Accordingly, the regenerative current of the assist motor 20 is prevented from flowing to the main power supply 23 formed of a lead battery, so that deterioration of the lead battery serving as the main power supply 23 is reduced.

When the electronic control unit 26 determines that the state parameter is in the regenerative current generation range C, the electronic control unit 26 controls the assist motor 20 so as to reduce the steering assist force.

The present embodiment has the following effects.

(1) In the auxiliary power supply device 30 of the present embodiment, the first switching circuit 31 includes the parasitic diode D2 (first diode) forming a parallel circuit together with the second switching element FET2 (first changeover switching element) and connected in a forward direction to the main power supply 23. The second switching circuit 32 includes the parasitic diode D4 (second diode) forming a parallel circuit together with the fourth switching element FET4 (second changeover switching element) and connected in a reverse direction to the auxiliary power supply 24.

When the steering angle θ and the steering speed |dθz/dt| (state parameter) representing a state of the rack shaft 14 (operation member) operated by the assist motor 20 (rotary electric machine) indicate that a reaction force that interferes with operation of the rotary electric machine is not applied, the electronic control unit 26 (control unit) turns ON the second switching element FET2 (first changeover switching element). Further, the electronic control unit 26 turns OFF the fourth switching element FET4 (second changeover switching element). When the steering angle θ and the steering speed |dθ/dt| (state parameter) indicate that a reaction force that interferes with operation of the rotary electric machine is applied, the electronic control unit 26 (control unit) turns OFF the second switching element FET2 (first changeover switching element) and the fourth switching element FET4 (second changeover switching element). Accordingly, the regenerative current of the assist motor 20 (rotary electric machine) is prevented from flowing to the main power supply 23, so that deterioration of the main power supply 23 can be reduced.

(2) In the auxiliary power supply device 30 of the present embodiment, the first switching circuit 31 includes the first switching element FET1 connected in series with the second switching element FET2, between the main power supply 23 and the second switching element FET2. The second switching circuit 32 includes the third switching element FET3 connected in series with the fourth switching element FET4, between the inverter 22 and the fourth switching element FET4. When the state parameter indicates that a reaction force that interferes with operation of the assist motor 20 is not applied, the electronic control unit 26 (control unit) turns ON both the first switching element FET1 and the second switching element FET2, and turns OFF both the third switching element FET3 and the fourth switching element FET4.

When the state parameter indicates that a reaction force that interferes with operation of the assist motor 20 is applied, the electronic control unit 26 turns ON the first switching element FET1, turns OFF the second switching element FET2, turns ON the third switching element FET3, and turns OFF the fourth switching element FET4.

With the above configuration, when the state parameter indicates that a reaction force that interferes with operation of the assist motor 20 is not applied, a direct current is supplied from the main power supply 23 to the inverter 22 via the first switching element FET1 and the second switching element FET2 of the first switching circuit 31. Further, even when the state parameter indicates that a reaction force that interferes with operation of the assist motor 20 is applied, a direct current is supplied from the main power supply 23 to the inverter 22 via the first switching element FET1 and the parasitic diode D2 (first diode) of the first switching circuit 31.

Further, when the state parameter indicates that a reaction force that interferes with operation of the assist motor 20 is applied, the electronic control unit 26 (control unit) turns ON the third switching element FET3, and turns OFF the fourth switching element FET4. Therefore, when a regenerative current is generated from the assist motor 20 (rotary electric machine) thereafter, the regenerative current flows through the inverter 22, and then flows to the auxiliary power supply 24 via the third switching element FET3 and the parasitic diode D4 (second diode) of the second switching circuit 32. Accordingly, the regenerative current of the assist motor 20 (rotary electric machine) is prevented from flowing to the main power supply 23, so that deterioration of the main power supply 23 can be reduced.

(3) In the auxiliary power supply device 30 of the present embodiment, the first switching element FET1 and the second switching element FET2 are n-channel MOSFETs reversely connected in series with each other, and the third switching element FET3 and the fourth switching element FET4 are n-channel MOSFETs reversely connected in series with each other. Accordingly, the effects of (2) can easily be achieved by the first to fourth switching elements formed of n-channel MOSFETs.

(4) In the auxiliary power supply device 30 of the present embodiment, the first diode of the first switching circuit 31 is the parasitic diode D2 of the second switching element FET2, and the second diode of the second switching circuit 32 is the parasitic diode D4 of the fourth switching element FET4. Thus, the first diode and the second diode are parasitic diodes, and therefore can be formed in the step of manufacturing the second switching element FET2 and the fourth switching element FET4.

(5) The EPS 10 of the present embodiment includes the auxiliary power supply device 30, wherein the assist motor 20 driven based on the steering torque TR applied to the steering wheel 11 (steering member) is a rotary electric machine. Accordingly, the EPS 10 can easily achieve the above effects when the steering wheel 11 (steering member) is turned to a position close to the turning limit.

(6) In the EPS 10 of the present embodiment, the state parameter includes the steering speed |dθ/dt| and the steering angle θ.

Thus, when the steering speed |dθ/dt| and the steering angle θ (state parameter) satisfy the regenerative current generation sign conditions, it means that the state is a pre-end-abutment operation state in which the steering wheel 11 (steering member) is turned to a position close to the turning limit. In this case, switching of the switching unit 25 can be controlled so as to prevent a regenerative current of the assist motor 20 (rotary electric machine) from flowing to the main power supply 23 formed of a lead battery.

The present invention is not limited to the embodiment described above. The above embodiment may be modified as described below. The first switching element to the fourth switching element of the above embodiment are n-channel MOSFETs. However, the present invention is not limited thereto. The switching elements may be other types of semiconductor devices such as insulated gate bipolar transistors (IGBTs).

The order in which the first switching element FET1 and the second switching element FET2 are connected to the main power supply may be reversed. The order in which the third switching element FET3 and the fourth switching element FET4 are connected to the inverter 22 may be reversed.

The main power supply 23 may be a power supply other than a lead battery. The auxiliary power supply 24 may be a power supply other than a lithium ion capacitor as long as the power supply is chargeable and dischargeable.

In the configuration of the above embodiment, the first switching element FET1 and the parasitic diode D1 may be omitted. In the configuration of the above embodiment, the third switching element FET3 and the parasitic diode D3 may be omitted.

In the above embodiment, diodes may be used in place of the parasitic diodes. In the above embodiment, the state parameter includes two parameters, namely, the steering speed |dθ/dt| and the steering angle θ. However, the state parameter is not limited to these two parameters. Further, the steered angle of the steered wheels 16 may be added as a state parameter. In the case where assist control is performed based on vector control, the amount of change in q-axis current may be added as a state parameter.

In the EPS 10 of the above embodiment, a pre-end-abutment operation state is determined based on the regenerative current generation sign conditions. However, the regenerative current generation sign conditions are not limited to conditions for detecting the pre-end-abutment operation state. For example, the regenerative current generation sign conditions may be conditions for determining the state immediately before a regenerative current is generated in the case where, for example, the steered wheel 16 hits a curb. In this case, the steering speed and steering angle of the assist motor 20 and the drive current of the motor may be used as the state parameter.

In the above embodiment, the auxiliary power supply device 30 is used in the EPS 10. However, the auxiliary power supply device 30 does not have to be used in combination with the EPS 10, and may be used in combination with other apparatuses.

What is claimed is:

1. An auxiliary power supply device comprising:
an auxiliary power supply that is connected in parallel to a main power supply and supplies a direct current to an inverter connected to a rotary electric machine in place of the main power supply;
a switching unit including a first switching circuit disposed between the main power supply and the inverter, and a second switching circuit disposed between the auxiliary power supply and the inverter; and
a control unit that switches between the main power supply and the auxiliary power supply to supply a direct current to the inverter by controlling the first switching circuit and the second switching circuit, wherein:
the first switching circuit includes a first diode forming a parallel circuit together with a first changeover switching element and connected in a forward direction to the main power supply;
the second switching circuit includes a second diode forming a parallel circuit together with a second changeover switching element and connected in a reverse direction to the auxiliary power supply; and
the control unit is configured to:
when a state parameter representing a state of an operation member operated by the rotary electric machine indicates that a reaction force that interferes with operation of the rotary electric machine is not applied, turn ON the first changeover switching element, and turn OFF the second changeover switching element; and
when the state parameter indicates that a reaction force that interferes with operation of the rotary electric machine is applied, turn OFF the first changeover switching element and the second changeover switching element.

2. The auxiliary power supply device according to claim 1, wherein:
the first switching circuit includes a first switching element connected in series with a second switching element serving as the first changeover switching element, between the main power supply and the second switching element;
the second switching circuit includes a third switching element connected in series with a fourth switching element serving as the second changeover switching element, between the inverter and the fourth switching element; and
the control unit is configured to,
when the state parameter indicates that a reaction force that interferes with operation of the rotary electric machine is not applied, turn ON both the first switching element and the second switching element of the first switching circuit, and turn OFF both the third switching element and the fourth switching element of the second switching circuit, and
when the state parameter indicates that a reaction force that interferes with operation of the rotary electric machine is applied, turn ON the first switching element, turn OFF the second switching element, turn ON the third switching element, and turn OFF the fourth switching element.

3. The auxiliary power supply device according to claim 2, wherein:
the first switching element and the second switching element are n-channel MOSFETs reversely connected in series with each other; and the third switching element and the fourth switching element are n-channel MOSFETs reversely connected in series with each other.

4. The auxiliary power supply device according to claim 3, wherein:
the first diode of the first switching circuit is a parasitic diode of the second switching element; and
the second diode of the second switching circuit is a parasitic diode of the fourth switching element.

5. An electric power steering system comprising:
the auxiliary power supply device of claim 1;
wherein the rotary electric machine is a motor that is driven based on a steering torque applied to a steering member.

6. The electric power steering system according to claim 5, wherein the state parameter includes at least a steering speed and a steering angle.

7. The electric power steering system according to claim 5, wherein the state parameter includes a steering speed and a q-axis current of the motor.

* * * * *